United States Patent
Kashef

(10) Patent No.: US 10,887,123 B2
(45) Date of Patent: Jan. 5, 2021

(54) MULTIPROTOCOL AUDIO/VOICE INTERNET-OF-THINGS DEVICES AND RELATED SYSTEM

(71) Applicant: Libre Wireless Technologies, Inc., Irvine, CA (US)

(72) Inventor: Hooman Kashef, Coto de Caza, CA (US)

(73) Assignee: LIBRE WIRELESS TECHNOLOGIES, INC., Irvine, CA (US)

( * ) Notice: Subject to any disclaimer, the term of this patent is extended or adjusted under 35 U.S.C. 154(b) by 0 days.

(21) Appl. No.: 15/788,201

(22) Filed: Oct. 19, 2017

(65) Prior Publication Data

US 2019/0123930 A1 Apr. 25, 2019

(51) Int. Cl.
| | | |
|---|---|---|
| *H04L 12/28* | (2006.01) | |
| *H04L 29/06* | (2006.01) | |
| *G06F 3/16* | (2006.01) | |
| *H04W 4/80* | (2018.01) | |
| *H04W 4/02* | (2018.01) | |
| *H04W 88/06* | (2009.01) | |

(52) U.S. Cl.
CPC .......... *H04L 12/2816* (2013.01); *G06F 3/167* (2013.01); *H04L 12/2803* (2013.01); *H04L 69/18* (2013.01); *H04W 4/02* (2013.01); *H04W 4/80* (2018.02); *H04W 88/06* (2013.01)

(58) Field of Classification Search
CPC ...... H04L 12/2816; H04W 4/80; H04W 4/02; H04W 88/06
See application file for complete search history.

(56) References Cited

U.S. PATENT DOCUMENTS

| | | |
|---|---|---|
| 8,428,654 B2 | 4/2013 | Oh et al. |
| 2006/0227964 A1 | 10/2006 | Gierach et al. |
| 2007/0123194 A1* | 5/2007 | Karaoguz ........... H04M 1/7253 455/403 |
| 2012/0108221 A1 | 5/2012 | Thomas et al. |
| 2015/0006695 A1 | 1/2015 | Gupta |

(Continued)

FOREIGN PATENT DOCUMENTS

EP 2 950 510 A1 12/2015

*Primary Examiner* — Steven H Nguyen
(74) *Attorney, Agent, or Firm* — Metis IP LLC

(57) ABSTRACT

A system of multiprotocol audio/voice devices includes a plurality of consumer electronic multiprotocol audio/voice devices and a wearable multiprotocol audio/voice device accessible by a user. The wearable multiprotocol audio/voice device may determine wireless protocols acceptable by the plurality of consumer electronic multiprotocol audio/voice devices, and the user may control the plurality of consumer electronic multiprotocol audio/voice devices by the wearable multiprotocol audio/voice device without requiring a unique application. The wearable multiprotocol audio/voice device includes a package housing a digital signal processor (DSP), wireless communication modules, and a multipoint control unit (MCU) coupled to the DSP and the wireless communication modules. The DSP is coupled to a microphone and configured to provide voice control signals to the MCU. The wireless communication modules are coupled to antennas. The MCU enables wireless radio frequency (RF) communication links over the wireless protocols.

11 Claims, 8 Drawing Sheets

(56) References Cited

U.S. PATENT DOCUMENTS

| | | | |
|---|---|---|---|
| 2015/0302855 A1 | 10/2015 | Kim et al. | |
| 2016/0314453 A1* | 10/2016 | Rogers | G06Q 20/327 |
| 2017/0032787 A1* | 2/2017 | Dayal | A61H 3/061 |
| 2017/0048613 A1* | 2/2017 | Smus | H04M 1/7253 |
| 2017/0149958 A1* | 5/2017 | Xian | G06F 21/31 |
| 2017/0279894 A1 | 9/2017 | Chen | |
| 2017/0311368 A1* | 10/2017 | Kandur Raja | H04W 76/14 |
| 2018/0004372 A1* | 1/2018 | Zurek | G06F 3/0484 |
| 2018/0048701 A1* | 2/2018 | Iwami | H04W 8/00 |
| 2018/0062691 A1* | 3/2018 | Barnett, Jr. | H04B 1/401 |
| 2018/0336074 A1* | 11/2018 | Lamb | G06F 9/541 |

* cited by examiner

MULTIPROTOCOL AUDIO/VOICE INTERNET-OF-THINGS DEVICES AND RELATED SYSTEM

BACKGROUND

The internet-of-things (IoT) refers to the networking of physical objects embedded with electronic devices. As more objects are networked, new ways of interacting with them become available. IoT devices can collect, process, act on, and communicate data for such purposes as automation, user reporting, and remote control. IoT devices are rapidly being deployed in home, industrial, metropolitan, and environmental applications, and using voice control for ease of use.

Multiple IoT devices can be connected using wireless radio frequency (RF) communication links. However, conventional IoT devices establish the communication links by using various wireless protocols. Numerous wireless protocols exist, including WiFi™, Bluetooth™, ZigBee™, and more. Manufacturers of different IoT devices may use any one of these numerous wireless protocols. The existence of numerous wireless protocols hinders linking all available IoT devices, and is commonly referred to as the "basket of remotes" problem.

In one solution, a unique software application is installed on an IoT device in order to enable it to communicate with IoT devices having different wireless protocols. This solution is difficult to implement, particularly due to the complexity of the software and the need for the software developer to be familiar with the numerous wireless protocols. If installed on a device that uses voice control, the software may need to re-implement algorithms that relate voice commands to protocol commands in light of the additional protocols. Moreover, it is difficult for IoT devices operating only on a local network to install the software.

SUMMARY

The present disclosure is directed to multiprotocol audio/voice internet-of-things (IoT) devices and related system, substantially as shown in and/or described in connection with at least one of the figures, and as set forth in the claims.

DETAILED DESCRIPTION

Figure 1:
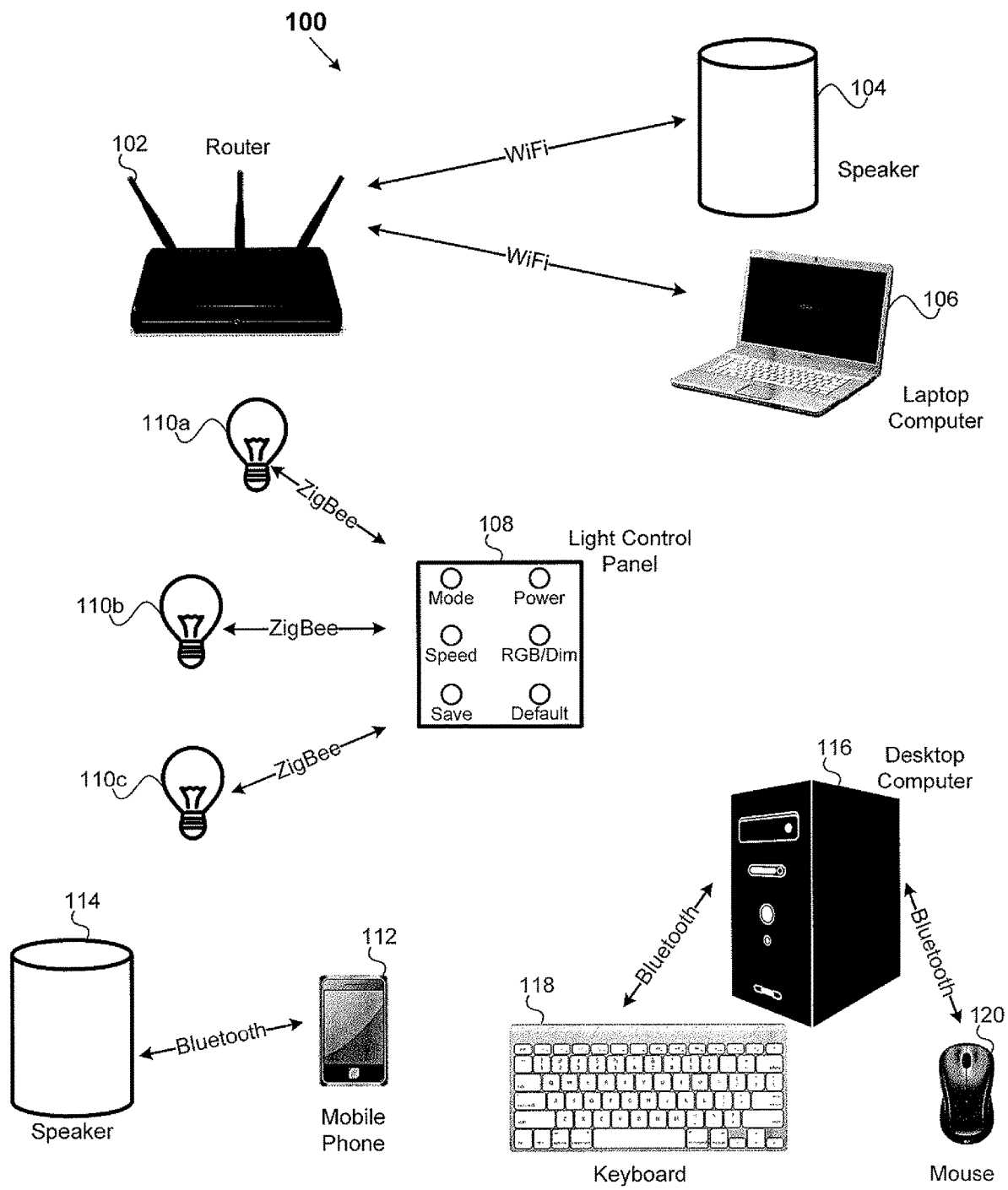
FIG. 1 illustrates an exemplary diagram of a portion of a conventional wireless communication system.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 illustrates an exemplary diagram of a portion of a conventional wireless communication system. As illustrated in FIG. 1, wireless communication system 100 includes router 102, speaker 104, laptop computer 106, light control panel 108, lights 110a, 110b, and 110c, mobile phone 112, speaker 114, desktop computer 116, keyboard 118, and mouse 120.

As shown in FIG. 1, router 102 wirelessly connects to and communicates with speaker 104 and laptop computer 106 using WiFi™ as the wireless protocol. The WiFi™ protocol includes the Institute of Electrical and Electronics Engineers (IEEE) 802.11 standards. For example the WiFi™ protocol may be IEEE 802.11a, 802.11b, 802.11g, and/or 802.11n standards and use 2.4 GHz and/or 5 GHz frequency bands. In the present implementation router 102, speaker 104, and laptop computer 106 have integrated WiFi™ modules that enable use of the WiFi™ protocol. The WiFi™ protocol may be used, for example, to stream music and video from router 102 to speaker 104 and laptop computer 106 respectively. Speaker 104 may generally be any audio control system, such as a home theater receiver or headphones. Laptop computer 106 may generally be any data storage and processing device, such as a tablet.

FIG. 1 also shows light control panel 108 wirelessly connects to and communicates with lights 110a, 110b, and 110c using ZigBee™ as the wireless protocol. The ZigBee™ protocol includes versions of the ZigBee™ Alliance specifications, such as ZigBee™ 2006 and/or ZigBee™ PRO. The ZigBee™ protocol may comply with IEEE 802.15.4 standards and use 868 MHz, 915 MHz. and/or 2.4 GHz frequency bands. In the present implementation light control panel 108 and lights 110a, 110b, and 110c have integrated ZigBee™ modules that enable use of the ZigBee™ protocol. The ZigBee™ protocol may be used, for example, to stream light control signals from light control panel 108 to lights 110a, 110b, and 110c. Light control signals may change a lighting pattern, power off, change the color, change the speed, or revert to default color lights 110a, 110b, and 110c. Light control panel 108 may generally be any control panel, such as a wall-mounted panel or a virtual display panel on a ZigBee™ integrated remote. Lights 110a, 110b, and 110c may generally be any controllable light, such as a dimmable light, a red green blue light-emitting diode (RGB LED), or correlated color temperature LED (CCT LED).

As further shown in FIG. 1, mobile phone 112 wirelessly connects to and communicates with speaker 114, and desktop computer 116 wirelessly connects to and communicates with keyboard 118 and mouse 120, using Bluetooth™ as the wireless protocol. The Bluetooth™ protocol includes versions of the Bluetooth™ specifications, such as Bluetooth™ Basic Rate. Bluetooth™ Enhanced Data Rate (EDR), and/or Bluetooth™ Low Energy (LE). The Bluetooth™ protocol may comply with IEEE 802.15.1 standards and use the 2.4 GHz frequency band. In the present implementation mobile phone 112, speaker 114, desktop computer 116, keyboard 118, and mouse 120 have integrated Bluetooth™ modules that enable use of the Bluetooth™ protocol. The Bluetooth™ protocol may be used, for example, to stream music from mobile phone 112 to speaker 114, and to stream interface control signals from keyboard 118 and mouse 120 to desktop computer 116. Speaker 114 may generally be any audio control system, such as a home theater receiver or headphones. Desktop computer 116 may generally be any data storage and processing device, such as a tablet. Keyboard 118 and mouse 120 may generally be any human interface device, such as a joystick.

Notably, in wireless communication system 100, devices having different wireless protocols do not connect to and communicate with each other. For example, WiFi™-enabled router 102 does not communicate with ZigBee™-enabled light control panel 108, and neither WiFi™-enabled router 102 nor ZigBee™-enabled light control panel 108 communicates with Bluetooth™-enabled speaker 114. In practice, use of numerous IoT devices burdens a user with a need for multiple gateways, one for each protocol.

Figure 2A:
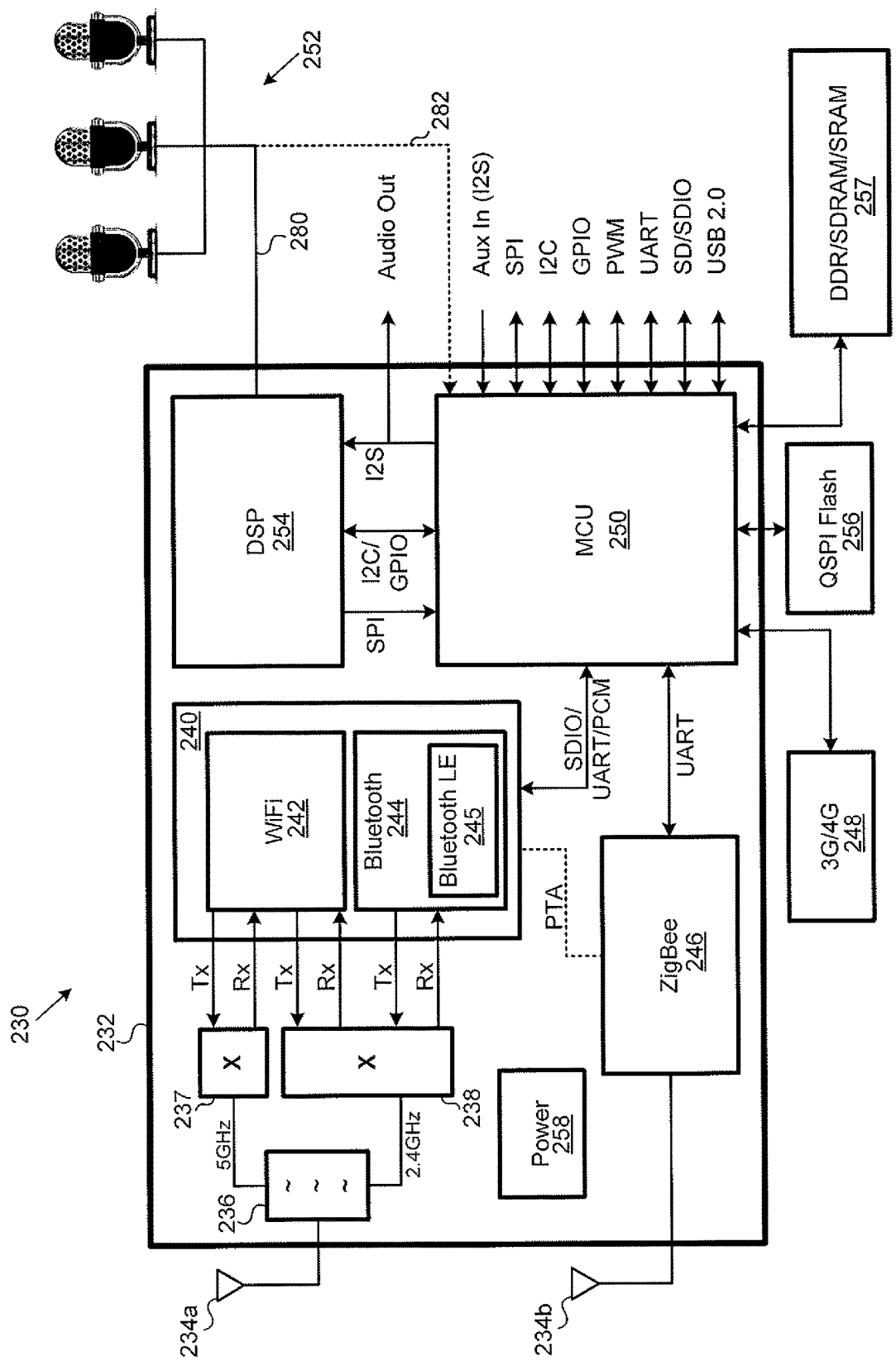
FIG. 2A illustrates a system diagram of a portion of an exemplary multiprotocol audio/voice internet-of-things device (MAVID™) according to one implementation of the present application.

FIG. 2A illustrates a system diagram of a portion of an exemplary multiprotocol audio/voice internet-of-things device (MAVID™) according to one implementation of the present application. MAVID™ is a trademark of Libre Wireless Technologies, Inc. As illustrated in FIG. 2A, MAVID™ 230 includes package 232, antennas 234a and 234b, diplexer 236, RF switches 237 and 238, dual-band wireless communication module 240, having WiFi™ communication module 242, Bluetooth™ communication module 244, and Bluetooth™ LE communication module 245, ZigBee™ communication module 246, third generation and fourth generation mobile technology (3G/4G) communication module 248, multipoint control unit (MCU) 250, microphone 252, lines 280 and 282, digital signal processor (DSP) 254, quad serial peripheral interface (QSPI) flash memory 256, random access memory (RAM) 257, and power supply 258.

As shown in FIG. 2A, diplexer 236, RF switches 237 and 238, dual-band wireless communication module 240, having WiFi™ communication module 242, Bluetooth™ communication module 244, and Bluetooth™ LE communication module 245, ZigBee™ communication module 246, MCU 250, DSP 254, and power supply 258 are located inside package 232. Package 232 may be a small form factor package having dimensions of approximately one inch by inch (1"×1") or less. As also shown in FIG. 2A, antennas 234a and 234b, 3G/4G communication module 248, microphone 252, QSPI flash memory 256, and RAM 257 are located outside package 232. Antennas 234a and 234b, 3G/4G communication module 248, microphone 252, QSPI flash memory 256, and RAM 257 may be located, for example, on a printed circuit board (PCB) (not shown in FIG. 2A). Package 232 may also be located on the PCB.

Antennas 234a and 234b located outside package 232 are used to receive or transmit RF signals according to various wireless protocols. For example, antenna 234a is used to receive or transmit RF signals according to the WiFi™ and Bluetooth™ protocols, and antenna 234b is used to receive or transmit RF signals according to the ZigBee™ protocol. Antennas 234a and 234b may be, for example, patch antennas or microstrip antennas or other types of antennas. In one implementation, antennas 234a and 234b may each be an antenna array having more than one element.

As shown in FIG. 2A, antenna 234a is used for both WiFi™ and Bluetooth™ protocols. Antenna 234a is coupled to diplexer 236. Diplexer 236 differentiates RF signals in different frequency bands. For example, in the present implementation, diplexer 236 differentiates signals in the 2.4 GHz frequency band from signals in the 5 GHz frequency band. The 5 GHz signals are coupled to RF switch 237, which switches the signals between transmit and receive lines, and are then coupled to WiFi™ communication module 242 in dual band wireless communication module 240. The 2.4 GHz signals are coupled to RF switch 238, which switches the signals between transmit and receive lines, and are then coupled to WiFi™ communication module 242 and Bluetooth™ communication module 244 in dual band wireless communication module 240. Antenna 234b is coupled to ZigBee™ communication module 246. In one implementation, antenna 234b may be used for more than one wireless protocol.

WiFi™ communication module 242, Bluetooth™ communication module 244, and ZigBee™ communication module 246 process RF signals according to the standards of the WiFi™ protocol, the Bluetooth™ protocol, and the ZigBee™ protocol respectively. Because concurrent use of multiple wireless protocols generally results in interference and collisions, WiFi™ communication module 242. Bluetooth™ communication module 244, and ZigBee™ communication module 246 are also responsive to and controlled by control signals from MCU 250. As shown in FIG. 2A, WiFi™ communication module 242, Bluetooth™ communication module 244, and ZigBee™ communication module 246 are coupled to MCU 250 through hardware communication interfaces, such as secure digital input output (SDIO), universal asynchronous receiver/transmitter (UART), and pulse code modulation (PCM) interfaces. These interfaces are bidirectional, allowing the communication modules to report data to MCU 250 for additional processing, and allowing MCU 250 to send control signals to the communication modules. For example, WiFi™ communication module 242, Bluetooth™ communication module 244, and ZigBee™ communication module 246 may report information regarding current and planned operational states, bit and packet error rates, signal and noise power levels, frequencies and channels, and tuning. MCU 250 may perform interference assessments based on information reported by the communication modules, determine interference solutions based on the interference assessments, and send control signals to the communication modules based on the determined interference solutions. Thus, MCU acts as a packet traffic arbiter (PTA) to manage the coexistence of multiple wireless protocols, enabling MAVID™ 230 to concurrently form wireless RF communication links over those multiple wireless protocols.

In FIG. 2A, 3G/4G module 248 is coupled to MCU 250. MCU 250 interacts with 3G/4G module in substantially the same manner as the other wireless communication modules described above. 3G/4G module may be located outside package 232 for other considerations such as size, heat dissipation, and/or electrical isolation. Optionally, as shown in FIG. 2A, dual-band wireless communication module 240 is coupled to ZigBee™ module 246 through a PTA interface, to more efficiently compare data from dual-band wireless communication module 240 with data from ZigBee™ module 246 and reduce the processing burden of MCU 250. In one implementation, MAVID™ 230 may form wireless RF communication links over other wireless protocols instead of, or in addition to, those shown in FIG. 2A. For example, MAVID™ 230 may use Long Range (LoRa), Z-Wave, Digital Enhanced Cordless Technology (DECT), and any other wireless protocols.

As shown in FIG. 2A, MAVID™ 230 includes microphone 252. Microphone 252 is configured to receive voice from a user. In the present implementation, microphone 252 is a microphone array with three microphone elements. Microphone 252 may provide beamforming capability to improve reception of far-field voice and enable voice tracking. In various implementations, microphone 252 may be a single microphone element or a microphone array with more or fewer microphone elements than shown in FIG. 2A. The number of microphone elements may depend on how critical sound is for MAVID™ 230.

Microphone 252 is coupled to DSP 254 through line 280. DSP 254 is configured to receive and process voice signals from microphone 252. DSP 254 performs voice signal conditioning, such as noise filtration, voice cleanup, and gain control. DSP 254 also performs voice recognition analysis. Optionally, as shown in FIG. 2A, microphone 252 may be coupled to MCU 250 through line 282, and then coupled to DSP 254. In one implementation, DSP 254 employs a wake-up scheme wherein components of MAVID™ 230 are kept in a low-power operational state until the occurrence of a detectable event, such as DSP 254 recognizing a user speaking "Jarvis" or another keyword.

As shown in FIG. 2A, DSP 254 is coupled to MCU 250 through hardware communication interfaces, such serial peripheral interface (SPI), inter-integrated circuit (I2C), general purpose input output (GPIO), and inter-IC sound (I2S) interfaces. These interfaces allow MCU 250 to provide feedback to DSP 254, and DSP 254 to provide voice control signals to MCU 250. MCU 250 is configured to enable wireless RF communication links over multiple wireless protocols in response to the voice control signals received from DSP 254. For example, while MAVID™ 230 is streaming audio to a speaker (not shown in FIG. 2A) over the Bluetooth™ protocol, a user may speak the words "lights show." DSP 254 may provide a voice control signal to MCU 250 corresponding to voice recognition of the words "lights show." MCU 250 may process both the voice control signal and information reported by Bluetooth™ communication module 244, and then enable MAVID™ 230 to connect to lights (not shown in FIG. 2A) over the ZigBee™ protocol while maintaining the connection to the speaker over the Bluetooth™ protocol. In other examples, MCU 250 enables MAVID™ 230 to communicate over multiple wireless protocols in response to voice control signals corresponding to voice recognition of different words.

As also shown in FIG. 2A, MAVID™ 230 includes QSPI flash memory 256 coupled to MCU 250. MCU 250 may process information stored in QSPI flash memory 256, in addition to voice control signals and information reported by wireless communication modules. For example, QSPI flash memory 256 may store a previous multiprotocol connection's configuration, so that MCU 250 can access the configuration and reduce processing burden of MCU 250 upon a similar subsequent multiprotocol connection. As also shown in FIG. 2A, MAVID™ 230 includes RAM 257 coupled to MCU 250. MCU 250 may process information stored in RAM 257, in addition to voice control signals and information reported by wireless communication modules. RAM 257 may be, for example, double data rate (DDR) synchronous dynamic RAM (SDRAM) or DDR static RAM (SRAM).

MCU 250 may process information from external hardware communication interfaces such as external inter-IC sound (I2S) (shown as "Aux In (I2S)" in FIG. 2A), serial peripheral interface (SPI), inter-integrated circuit (I2C), general purpose input output (GPIO), pulse width modulation (PWM), universal asynchronous receiver transmitter (UART), secure digital/secure digital input output (SD/SDIO), and/or universal serial bus (USB) interfaces. Power supply 258 supplies power to components of MAVID™ 230.

Figure 2B:
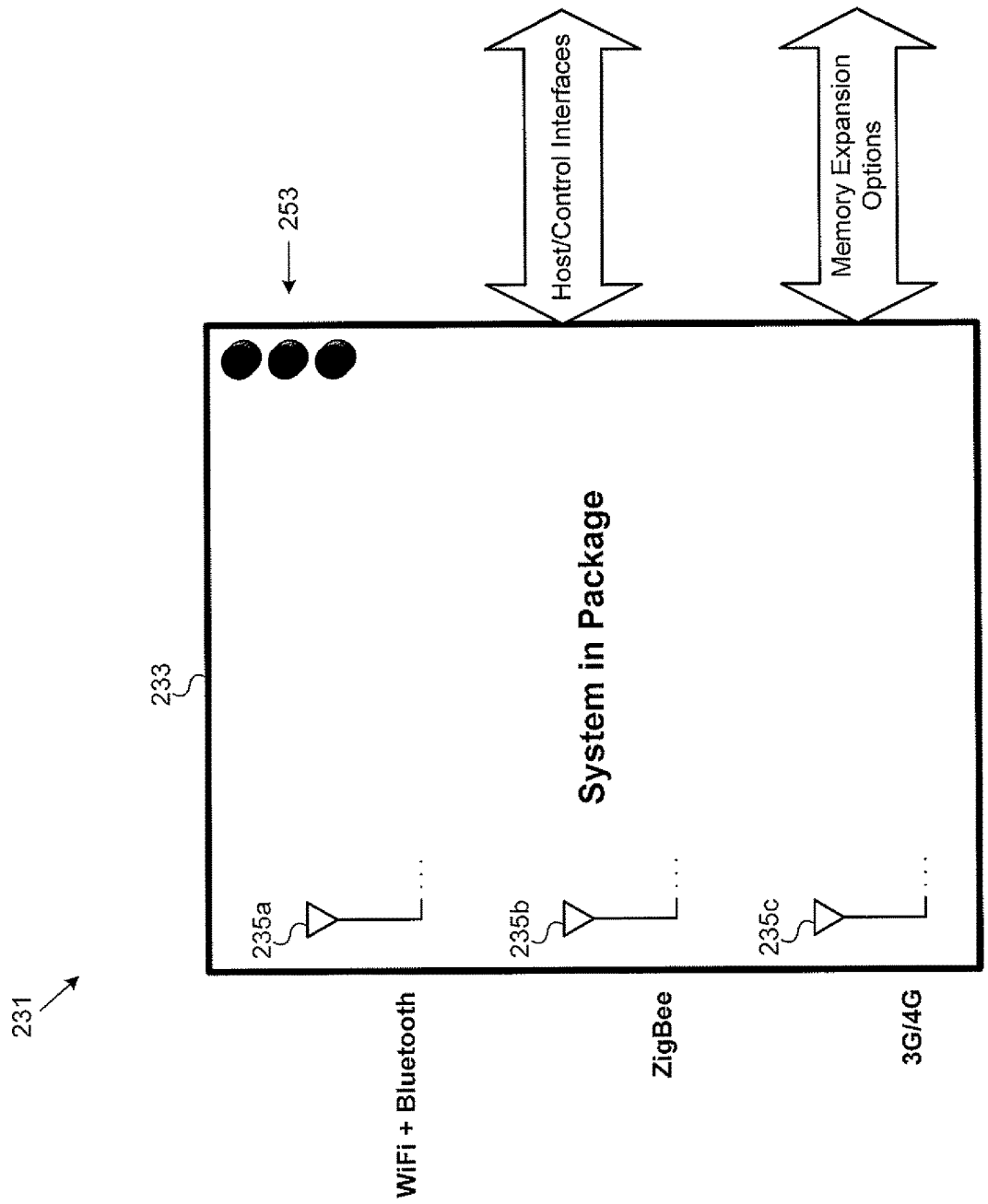
FIG. 2B illustrates a system diagram of a portion of an exemplary multiprotocol audio/voice internet-of-things device (MAVID™) according to one implementation of the present application.

FIG. 2B illustrates a system diagram of a portion of an exemplary multiprotocol audio/voice internet-of-things device (MAVID™) according to one implementation of the present application. As illustrated in FIG. 2B, MAVID™ 231 includes package 233 having antennas 235 a and 235 b and microphone input interface 253. In FIG. 2B, package 233 is a system-level package, such as PCB or ceramic system-in-package (SiP), and may be larger than small form factor package 232 in FIG. 2A. Microphone input interface 253 enables MAVID™ 231 to receive voice from a user. For example, package 233 may house one or more microelectromechanical systems (MEMS) microphones that receive voice from a user through microphone input interface 253. The MEMS microphones may be, for example, condenser, electret, or piezoresistive MEMS microphones. Microphone input interface 253 may be, for example, an aperture that enables diaphragms and other components of the MEMS microphones to interact with external user voice. MAVID™ 231 is configured to connect to a variety of host/control interfaces, such as through external hardware communication interfaces discussed above. These host/control interfaces enable external hardware to communicate with drivers in MAVID™ 231. MAVID™ 231 is also configured to connect to a variety of memory expansion options. In various implementations, memory expansions may be external to package 233, internal to package 233, or partially external and partially internal. Memory expansions may include QSPI flash memory, DDR SDRAM, DDR SRAM, or any other type of memory.

MAVID™ 231 in FIG. 2B is an alternative implementation to MAVID™ 230 in FIG. 2A, in that MAVID™ 231 in FIG. 2B is not divided into physically or logically distinct modules that separately perform the functionalities of dual-band wireless communication module 240, WiFi™ communication module 242, Bluetooth™ communication module 244, Bluetooth™ LE communication module 245, ZigBee™ communication module 246, 3G/4G communication module 248, DSP 254, MCU 250, diplexer 236, RF switches 237 and 238, QSPI flash memory 256, RAM 257, and/or microphone 252. Instead, MAVID™ 231 in FIG. 2B can perform the same or similar functionalities as MAVID™ 230 in FIG. 2A without requiring or needing separate physically or logically distinct modules. For example, a uniquely combined circuitry in MAVID™ 231 in FIG. 2B can perform all or some of the functions performed separately by dual-band wireless communication module 240, WiFi™ communication module 242, Bluetooth™ communication module 244, Bluetooth™ LE communication module 245, ZigBee™ communication module 246, 3G/4G communication module 248, DSP 254, MCU 250, diplexer 236, RF switches 237 and 238, QSPI flash memory 256, RAM 257, and/or microphone 252 in MAVID™ 230 in FIG. 2A.

Antennas 235a, 235b, and 235c in FIG. 2B are used to receive or transmit RF signals according to various wireless protocols. In the present implementation, antennas 235a, 235b, and 235c are coupled to enabling circuits in package 233. Antenna 235a is used to receive or transmit RF signals according to the WiFi™ and Bluetooth™ protocols. Antennas 235 band 235c are used to receive or transmit RF signals according to the ZigBee™ and 3G/4G protocols respectively. Antennas 235a, 235b, and 235c may be, for example, patch antennas or microstrip antennas or other types of antennas. In one implementation, antennas 235a, 235b, and 235c may each be an antenna array having more than one element. Antennas 235a and 235b in FIG. 2B may correspond to antennas 234a and 234b in FIG. 2A respectively. As shown in FIG. 2B, antenna 235a may be used for both WiFi™ and Bluetooth™ protocols. In various implementations, one or each of antennas 235b and 235c may be used for more than one wireless protocol.

For the purpose of an example only, an exemplary use of MAVID™ 231 is described hereafter. While MAVID™ 231 is streaming audio to a speaker (not shown in FIG. 2B) over the Bluetooth™ protocol using antenna 235a, a user may speak the words "lights show." MAVID™ 231 may process the user's words and information regarding RF signals at antenna 235 a, and then MAVID™ 231 may connect to lights (not shown in FIG. 2B) over the ZigBee™ protocol using antenna 235b, while maintaining the connection to the speaker over the Bluetooth™ protocol using antenna 235a. Thus, without requiring installation of a unique software application, MAVID™ 231 in FIG. 2B communicates over multiple wireless protocols in response to a voice command from a user.

Figure 3A:
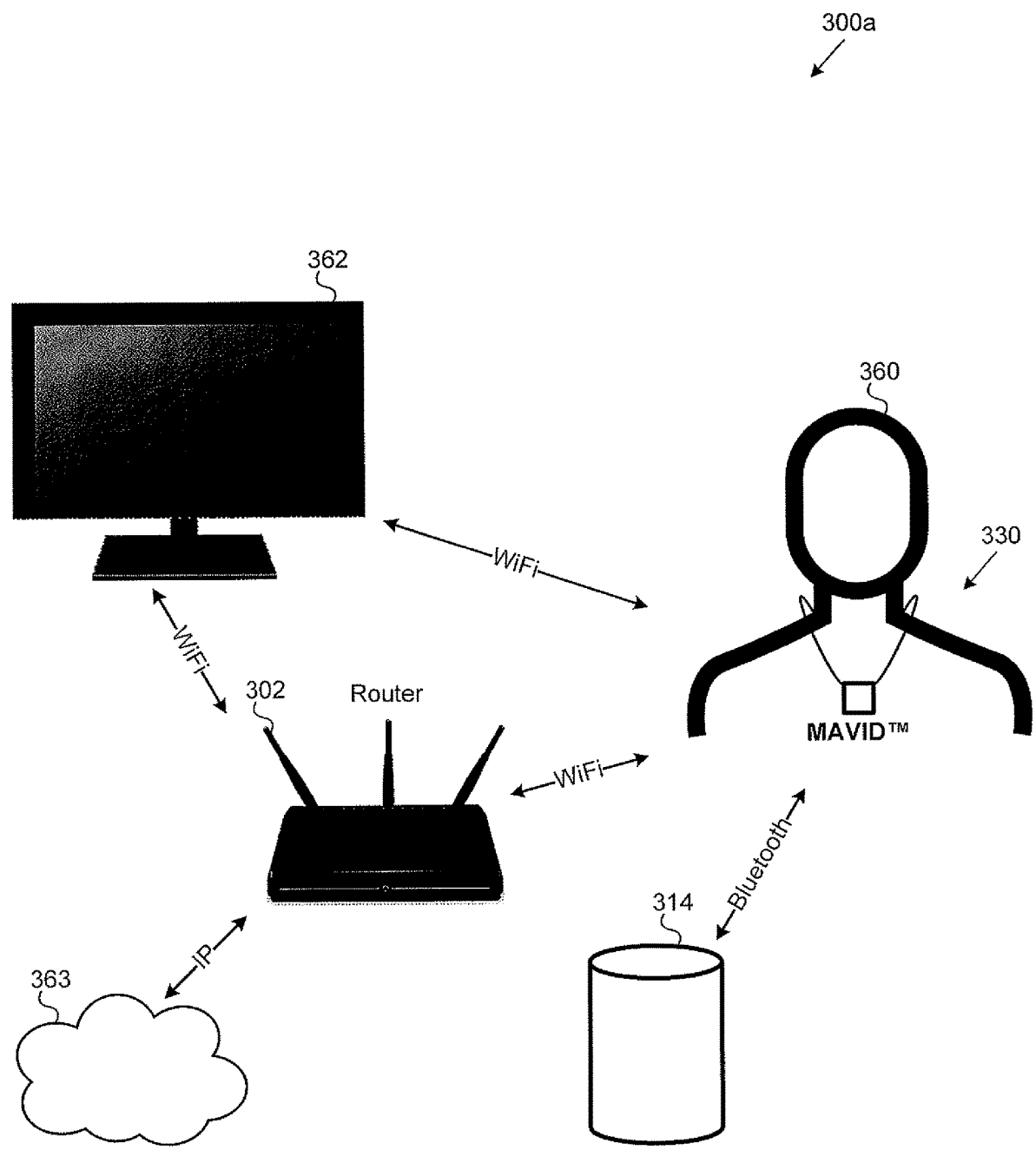
FIG. 3A illustrates an exemplary diagram of a portion of a wireless communication system according to one implementation of the present application.

FIG. 3A illustrates an exemplary diagram of a portion of a wireless communication system according to one implementation of the present application. As illustrated in FIG. 3A, wireless communication system 300a includes speaker 314, router 302, television 362, cloud platform 363, user 360, and wearable MAVID™ 330. Speaker 314 and router 302 in FIG. 3A may generally correspond to speaker 114 and router 102 in FIG. 1 respectively. In the present implementation, television 362 and router 302 have integrated WiFi™ modules, and speaker 314 has an integrated Bluetooth™ module. Wearable MAVID™ 330 may be any MAVID™ ergonomically designed to be worn by a user without creating a substantial obstruction. In the present implementation, wearable MAVID™ 330 is a necklace. In various implementations wearable MAVID™ may be, for example, a button, a watch, eyeglasses, headphones, or an earpiece. Wearable MAVID™ 330 in FIG. 3A may have any other implementations and advantages described above with respect to MAVID™ 230 in FIG. 2A.

In FIG. 3A, wireless communication system 300a may correspond to an "in-home" setting. As shown in FIG. 3A, wearable MAVID™ 330 connects to speaker 314 over the Bluetooth™ protocol and connects to television 362 over the WiFi™ protocol. Wearable MAVID™ 330 may control speaker 314 and television 362 by voice command from user 360. For example, wearable MAVID™ 330 may power on both Bluetooth™-enabled speaker 314 and WiFi™-enabled television 362 in response to a voice command from user 360. Wearable MAVID™ 330 also connects to router 302 over the WiFi™ protocol. Router 302 then connects to television 362 over the WiFi™ protocol and connects to cloud platform 363 over an internet protocol (IP) connection. Wearable MAVID™ 330 may control router 302 by voice command from user 360. For example, wearable MAVID™ 330 may instruct router 302 to connect to and utilize television 362 and cloud platform 363 in response to a voice command from user 360.

Figure 3B:
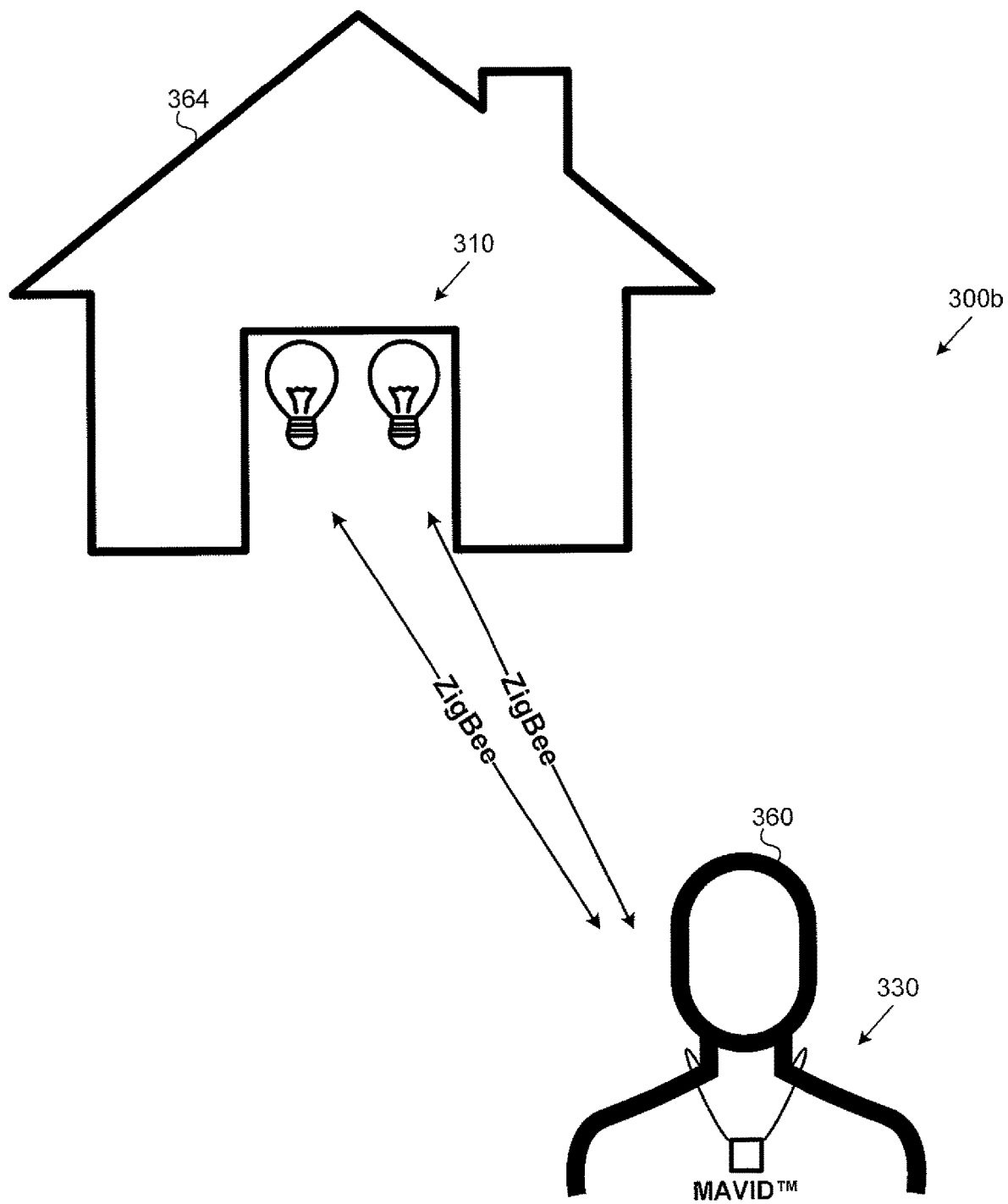
FIG. 3B illustrates an exemplary diagram of a portion of a wireless communication system according to one implementation of the present application.

FIG. 3B illustrates an exemplary diagram of a portion of a wireless communication system according to one implementation of the present application. As illustrated in FIG. 3B, wireless communication system 300b includes home 364 having lighting system 310, user 360, and wearable MAVID™ 330. In FIG. 3B, wireless communication system 300b may correspond to a "near-home" setting. As shown in FIG. 3B, wearable MAVID™ 330 connects to lighting system 310 over the ZigBee™ protocol. Wearable MAVID™ 330 may control lighting system 310 by voice command from user 360. For example, wearable MAVID™ 330 may power off ZigBee™-enabled lighting system 310 in response to a voice command from user 360.

Figure 3C:
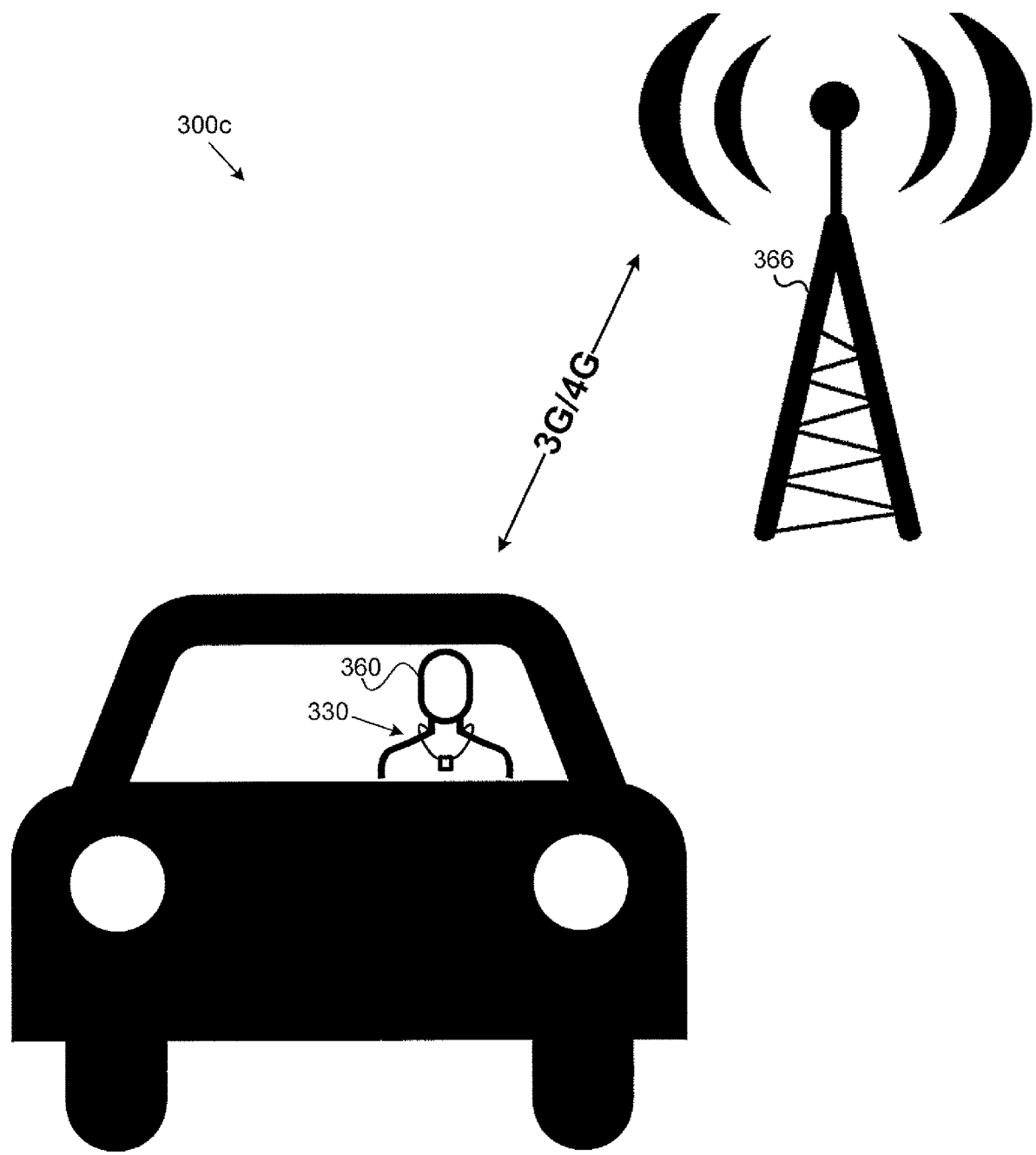
FIG. 3C illustrates an exemplary diagram of a portion of a wireless communication system according to one implementation of the present application.

FIG. 3C illustrates an exemplary diagram of a portion of a wireless communication system according to one implementation of the present application. As illustrated in FIG. 3C, wireless communication system 300c includes base station 366, user 360, and wearable MAVID™ 330. In FIG. 3C, wireless communication system 300c may correspond to an "away-from-home" setting. As shown in FIG. 3C, wearable MAVID™ 330 connects to base station 366 over the 3G/4G protocol. Wearable MAVID™ 330 may communicate with base station 366 by voice command from user 360. For example, wearable MAVID™ 330 may initiate a phone call through base station 366 in response to a voice command from user 360. As illustrated in FIGS. 3A-3C, the same wearable MAVID™ 330 can be used in different settings to connect to, and voice control, IoT devices using different wireless protocols.

Figure 4:
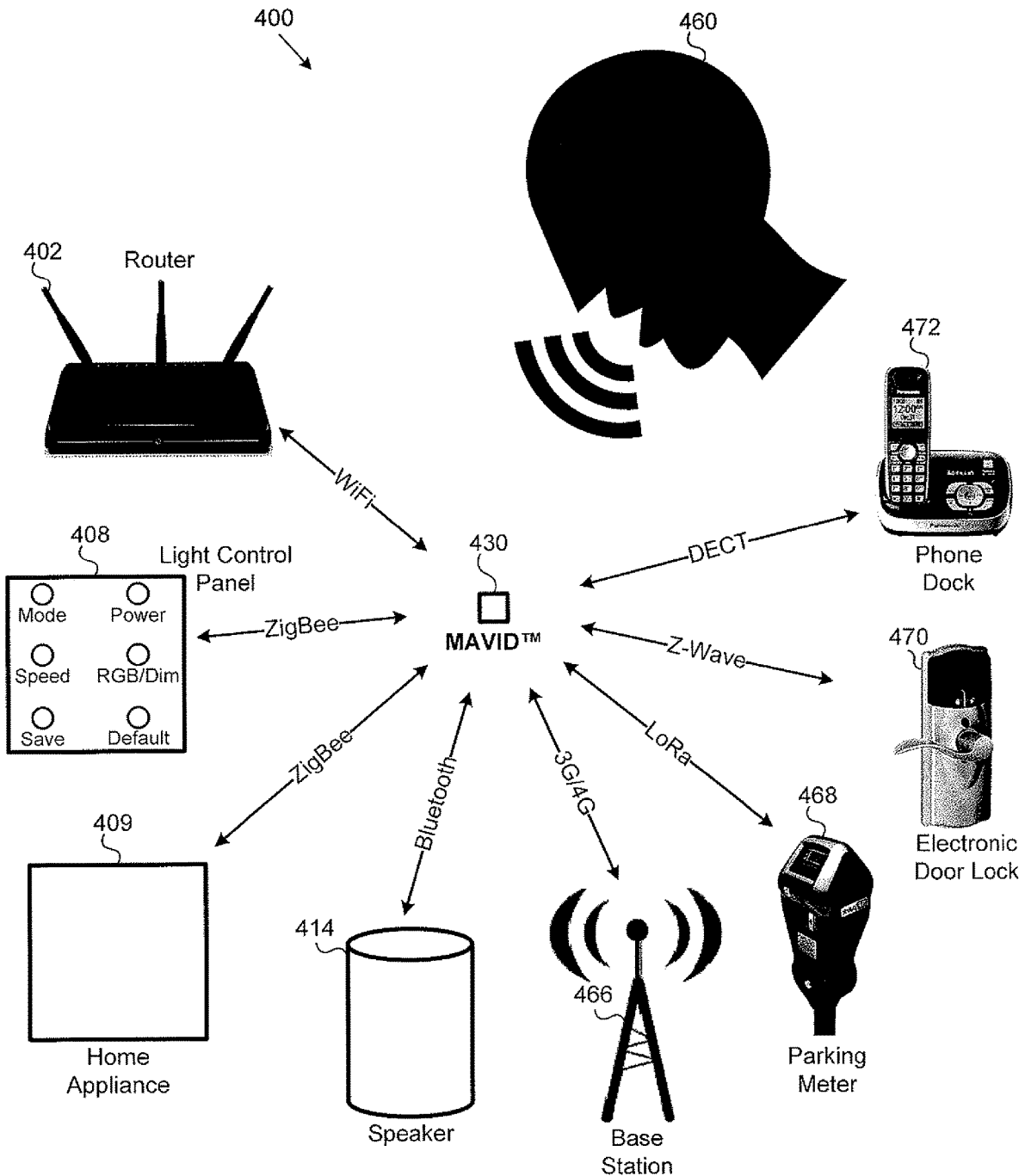
FIG. 4 illustrates an exemplary diagram of a portion of a wireless communication system according to one implementation of the present application.

FIG. 4 illustrates an exemplary diagram of a portion of a wireless communication system according to one implementation of the present application. As illustrated in FIG. 4, wireless communication system 400 includes user 460, MAVID™ 430, and a plurality of endpoint devices, including router 402, light control panel 408, home appliance 409, speaker 414, base station 466, parking meter 468, electronic door lock 470, and phone dock 472. Router 402, light control panel 408, and speaker 414 in FIG. 4 may generally correspond to router 102, light control panel 108, and speaker 114 in FIG. 1. Base station 466, parking meter 468, electronic door lock 470, and phone dock 472 are integrated with appropriate modules to enable use of the 3G/4G, LoRa, Z-Wave, and DECT protocols respectively. Home appliance 409 may be any home IoT device integrated with a ZigBee™ module, such as a television, a computer, a printer, a flash drive, an on-board diagnostics (OBD) dongle, a refrigerator, a coffee maker, a home security alarm, a security camera, a washer, a dryer, a thermostat, or a heating, ventilation, and air conditioning (HVAC) device.

As shown in FIG. 4, MAVID™ 430 can connect to each endpoint device over its respective protocol and control them by voice commands from user 460. Specifically, MAVID™ 430 connects to router 402, light control panel 408, home appliance 409, speaker 414, base station 466, parking meter 468, electronic door lock 470, and phone dock 472 over WiFi™, ZigBee™, ZigBee™, Bluetooth™, 3G/4G, LoRa, Z-Wave, and DECT protocols respectively. MAVID™ 430 may determine a wireless protocol acceptable by each endpoint device as part of this connection. For example, in response to a voice command from user 460, MAVID™ 430 may use various protocols until it determines that an endpoint device sufficiently corresponds to the voice command, and then connect to that endpoint device. In an alternative example, MAVID™ 430 may perform a complete scan of all protocols and then make a determination which endpoint device most closely corresponds to the voice command. Various algorithms may be used for determining the correspondence between voice commands and the desired endpoint device. In one implementation, these algorithms may be based in part on a location estimation derived from, for example, signal power levels at MAVID™ 430 or a global positioning system (GPS) module interfaced with MAVID™ 430. In another implementation, these algorithms may be based in part on information stored in a memory of MAVID™ 430, such as previous connection information stored in QSPI flash memory 256 of FIG. 2A. When MAVID™ 430 is connected with an endpoint device, MAVID™ 430 can also control the endpoint device in response to voice commands from user 460. Various algorithms may also be used to determine how voice commands from user 460 correspond to commands in the given wireless protocol. For example, an algorithm executed by MCU 250 of FIG. 2A may determine that the voice command "louder" from user 460 corresponds to a "VOLUME UP" command of a standardized audio profile of the Bluetooth™ protocol.

When using multiprotocol devices in the present implementation, IoT devices having different wireless protocols can be conveniently controlled from a single MAVID™ gateway by voice command. Also, the need for installing a unique application to connect to each IoT device having a unique wireless protocol is reduced and voice control algorithms generally do not need to be re-implemented; and IoT devices, especially IoT devices operating only on a local network, would generally not need to install new software.

Figure 5:
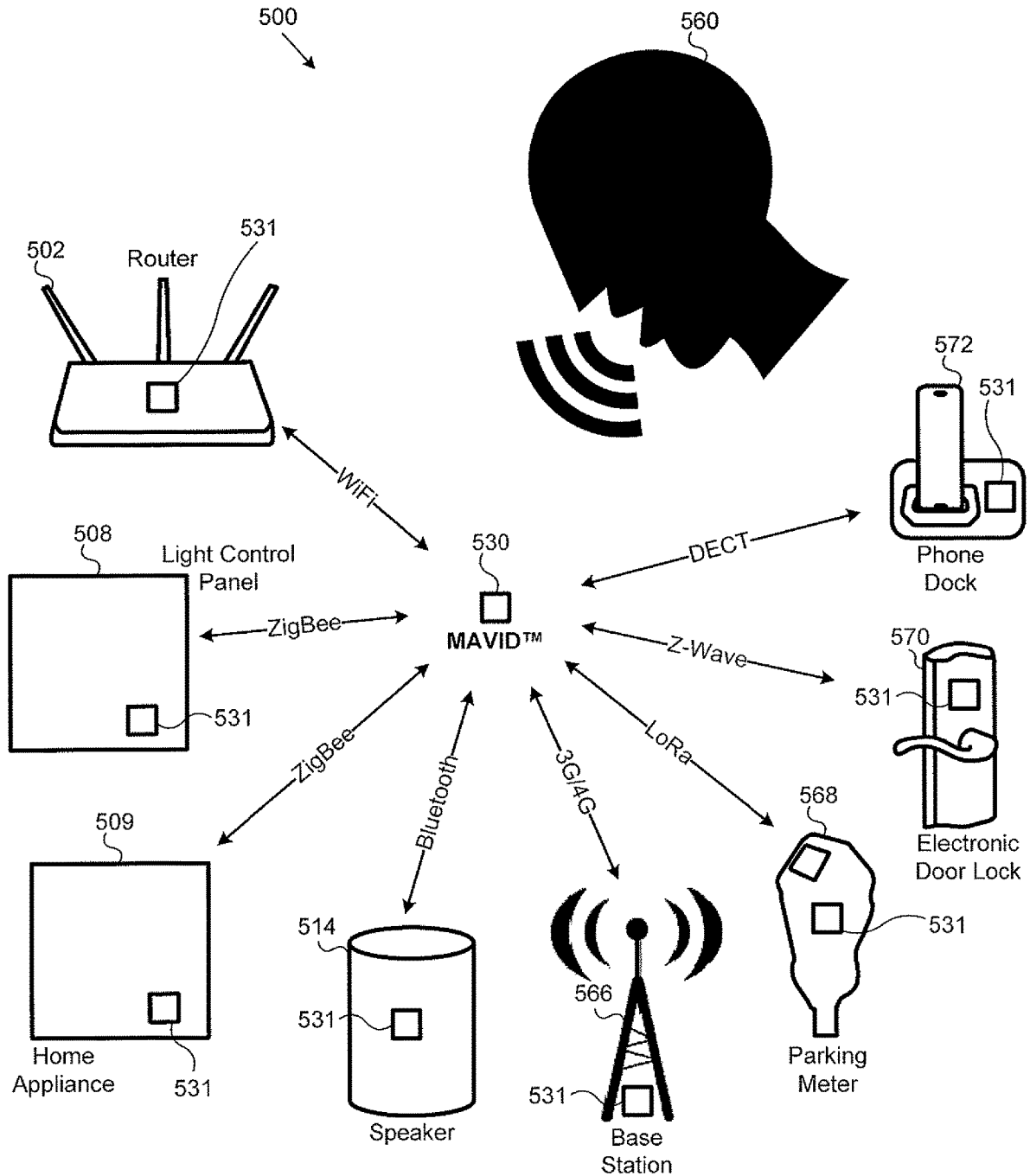
FIG. 5 illustrates an exemplary diagram of a portion of a wireless communication system according to one implementation of the present application.

FIG. 5 illustrates an exemplary diagram of a portion of a wireless communication system according to one implementation of the present application. As illustrated in FIG. 5, wireless communication system 500 includes user 560, MAVID™ 530, and a plurality of consumer electronic MAVIDs™, including router 502, light control panel 508, home appliance 509, speaker 514, base station 566, parking meter 568, electronic door lock 570, phone dock 572, and MAVID™ chips 531. In FIG. 5, router 502, light control panel 508, home appliance 509, speaker 514, base station 566, parking meter 568, electronic door lock 570, and phone dock 572 are each integrated with one of MAVID™ chips 531, rather than a singular wireless protocol module—as was the case with respect to FIG. 4.

By embedding MAVID™ chips 531 in each consumer electronic MAVID™, multiple consumer electronics can be conveniently controlled from a single gateway by voice command. In the present implementation, MAVID™ 530 is a gateway. In various implementations, any of MAVIDs™ 531 may be a gateway instead of or in addition to MAVID™ 530. Moreover, using MAVID™ chips 531 in each consumer electronic MAVID™ facilitates dynamic selection of wireless protocols. For example, MAVID™ 530 and a consumer electronic MAVID™ integrated with one of MAVID™ chips 531 may be communicating over the Bluetooth™ protocol, and then, based on distance calculations, signal strengths, bit error rates, scans, or information stored in memory, may coordinate with each other and switch to communicating over the ZigBee™ protocol if determined to be advantageous.

When using multiprotocol devices in the present implementation, IoT devices having different wireless protocols can be conveniently controlled from a single MAVID™ gateway by voice command. Moreover, in the present implementation, because a unique software application (i.e. a unique "app") is not required to connect to each IoT device that is itself a consumer electronic MAVID™, i.e. itself has a MAVID™ chip embedded therein, voice control algorithms do not need to be re-implemented, and the MAVID™-enabled IoT devices do not need to install new software.

Thus, various implementations of the present application achieve improved multiprotocol audio/voice devices for use in wireless IoT applications. From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

The invention claimed is:

1. A system of multiprotocol audio/voice devices comprising:
 a wearable multiprotocol audio/voice device connecting to a first consumer electronic device over a first wireless protocol, wherein:
  said wearable multiprotocol audio/voice device includes:
   a diplexer coupled to one of two or more antennas and configured to differentiate radio frequency (RF) signals in different frequency bands,
   two or more communication circuits, each of which is configured to process one of the differentiated RF signals according to a distinctive wireless protocol;
   a multipoint control unit (MCU) configured to receive information reported by the two or more communication circuits, and manage a coexistence of multiple RF communication links over different wireless protocols via an interference assessment;
   a microphone configured to receive a voice from a user and generate voice signals;
   a digital signal processor (DSP) configured to perform voice recognition analysis on the voice signals from the microphone, and employ a wake-up scheme to change an operational state of the wearable multiprotocol audio/voice device on occurrence of a detectable event via the voice recognition analysis; and
   a flash memory configured to store a previous multiprotocol connection's configuration to reduce processing burden of the MCU upon a subsequent multiprotocol connection, wherein the diplexer, the MCU, the DSP are located inside a package, while the microphone and the flash memory are located outside the package;
 said wearable multiprotocol audio/voice device being configured to:
 receive a voice command;
 in response to the voice command, use various wireless protocols until it determines that a second consumer electronic device corresponds to the voice command; and
 connect to said second consumer electronic over a second wireless protocol, while maintaining the connection to the first consumer electronic device over the first wireless protocol.

2. The system of claim 1, wherein said first wireless protocol or said second wireless protocol comprises WiFi™, ZigBee™, Bluetooth™, third generation mobile technology (3G), fourth generation mobile technology (4G), Long Range (LoRa), Z-Wave, and Digital Enhanced Cordless Technology (DECT).

3. The system of claim 1, wherein said second consumer electronic device is selected from the group consisting of: a speaker, a router, a television, a lighting system, a telephone, a computer, a printer, a flash drive, an on-board diagnostics (OBD) dongle, a refrigerator, a coffee maker, a home security alarm, a security camera, a thermostat, and a heating, ventilation, and air conditioning (HVAC) device.

4. The system of claim 1, wherein said wearable multiprotocol audio/voice device is selected from the group consisting of: a necklace, a button, a watch, eyeglasses, headphones, and an earpiece.

5. The system of claim 1, wherein said wearable multiprotocol audio/voice device determines said second wireless protocol acceptable by said second consumer electronic device based on a scan.

6. The system of claim 1, wherein said wearable multiprotocol audio/voice device determines a correspondence between said second consumer electronic device and the voice command based on a location estimation.

7. The system of claim 1, wherein said wearable multiprotocol audio/voice device determines said second wireless protocol acceptable by said second consumer electronic device based on information in a memory of said wearable multiprotocol audio/voice device.

8. A system of multiprotocol audio/voice devices comprising:
   a plurality of consumer electronic devices;
   a wearable multiprotocol audio/voice device connecting to a first consumer electronic device of the plurality of consumer electronic devices, wherein:
      said wearable multiprotocol audio/voice device includes:
         a diplexer coupled to one of two or more antennas and configured to differentiate radio frequency (RF) signals in different frequency bands,
         two or more communication circuits, each of which is configured to process one of the differentiated RF signals according to a distinctive wireless protocol;
         a multipoint control unit (MCU) configured to receive information reported by the two or more communication circuits, and manage a coexistence of multiple RF communication links over different wireless protocols via an interference assessment;
         a microphone configured to receive a voice from a user and generate voice signals;
         a digital signal processor (DSP) configured to perform voice recognition analysis on the voice signals from the microphone, and employ a wake-up scheme to change an operational state of the wearable multiprotocol audio/voice device on occurrence of a detectable event via the voice recognition analysis; and
         a flash memory configured to store a previous multiprotocol connection's configuration to reduce processing burden of the MCU upon a subsequent multiprotocol connection, wherein the diplexer, the MCU, the DSP are located inside a package, while the microphone and the flash memory are located outside the package;
   said wearable multiprotocol audio/voice device being configured to, in response to a voice command, use various wireless protocols until it determines that one or more second consumer electronic devices correspond to the voice command, and connecting to the one or more second consumer electronic devices, while maintaining the connection to the first consumer electronic device.

9. The system of claim 8, wherein said plurality of consumer electronic devices are selected from the group consisting of: a speaker, a router, a television, a lighting system, a telephone, a computer, a printer, a flash drive, an on-board diagnostics (OBD) dongle, a refrigerator, a coffee maker, a home security alarm, a security camera, a thermostat, and a heating, ventilation, and air conditioning (HVAC) device.

10. The system of claim 8, wherein said wearable multiprotocol audio/voice device is selected from the group consisting of: a necklace, a button, a watch, eyeglasses, headphones, and an earpiece.

11. The system of claim 8, wherein said wearable multiprotocol audio/voice device is a gateway.

* * * * *